Feb. 1, 1966  E. B. CHILDS ETAL  3,232,097
FUEL MONITORING AND CONTROL SYSTEM
Filed March 22, 1963  5 Sheets-Sheet 1

INVENTORS
ELBERT B. CHILDS
JOHN A.C. KRULISH
BY
Oswald N. Hayes
ATTORNEY

INVENTORS
ELBERT B. CHILDS
JOHN A.C. KRULISH

ATTORNEY

United States Patent Office 3,232,097
Patented Feb. 1, 1966

3,232,097
FUEL MONITORING AND CONTROL SYSTEM
Elbert B. Childs, Hastings-on-Hudson, and John A. C. Krulish, Albertson, N.Y., assignors to Socony Mobil Oil Company, Inc., a corporation of New York
Filed Mar. 22, 1963, Ser. No. 267,092
40 Claims. (Cl. 73—53)

This invention relates to monitoring and control techniques, and, more particularly, to the automatic monitoring of a fluid to determine its icing tendency and the automatic controlling of the composition of the fluid to provide a predetermined level of protection against icing.

The tendency of icing to occur during evaporation of volatile fluids in a stream of moist air or other gas can be controlled by the use of certain additives in the fluids. Generally, the amount of additive introduced into a fluid is determined experimentally, and an amount sufficient to provide a predetermined or specified minimum level of protection against icing is added in a fixed concentration during production. For example, in the blending of gasolines, the amount of additive introduced into a blend is typically the same for a number of different blends, even though it is known that the icing tendencies of such blends vary because of variations in the volatility and the heat of vaporization of the different hydrocarbon types forming the different blends. Consequently, in base gasolines with low icing tendencies, the amount of additive may be significantly greater than that required for adequate protection against carburetor icing caused by the freezing of condensed moisture in the carburetor venturi. The use of excessive amounts of additive unnecessarily increases the manufacturing cost of the finished product.

At present there are no convenient techniques for controlling the icing tendencies of fluids during their production which are coupled with a monitoring of the finished product to determine the amount of additive required to meet specified levels of protection. For example, the present methods of testing fuels for carburetor icing generally involve the use of an engine in an atmosphere controlled as to humidity and temperature to cause carburetor icing to occur. The conditions of the test are usually those which are most severe for the incidence of carburetor icing, and the criterion for determining whether or not the fuel is acceptable is simply whether or not the engine stalls. Among the disadvantages of these engine carburetor icing tests are the length of time involved to complete a test, difficulties with removing residues of additives from previously used fuels, and the lack of any quantitative results indicative of the amount of additive required for satisfactory icing protection when the icing protection is determined to be below standard. Because of these limitations, it has been impossible, or at least impractical, to control the quantity of additives in accordance with the carburetor icing tendencies of the particular fuel hydrocarbon types being blended.

The present invention provides for the automatic testing of a fluid to determine its icing tendency and the automatic adjustment of the amount of anti-icing additive introduced during the blending of the fluid in accordance with the results of the test. In particular, the invention incorporates an automatic monitor which includes an arrangement for periodically injecting the fluid under test into a venturi maintained under closely controlled temperature and humidity conditions. The buildup of ice on a throttle plate in the venturi is detected by a pressure sensor which generates a signal that may be recorded for visual monitoring. This signal, which is representative of the icing tendency of the fluid under test, is compared with a reference signal representative of the icing tendency of a reference fluid, and an error signal is generated thereby which controls the amount of anti-icing additive introduced into the fluid production process. The tests are repeated at predetermined intervals, and between each test ice is removed from the venturi and the venturi is prepared for the next test.

The time required for completing a test and making appropriate adjustment in the quantity of additive introduced into the fluid is relatively short, thereby enabling close and effective control of the icing tendency of the fluid to meet predetermined standards. By thus controlling the amount of additive in accordance with concurrent testing of the finished product, substantial cost savings are possible since the amount of additive is not in excess of that required for a predetermined degree of protection. Further, the test conditions, such as temperature and humidity and the rate of flow of the fluid through the venturi, for example, and the standard degree of icing protection provided can all readily and easily be changed in accordance with the environmental conditions of the area in which the finished fluid is intended for use, for example, all to provide a system easily adaptable to many different conditions and criteria.

Reference should be made to the following detailed description of representative apparatus embodying the invention, which is to be read in conjunction with the accompanying drawings, in which.

For the purpose of describing the invention, the apparatus illustrated and its operations will be set forth in the context of determining and controlling the icing tendencies of gasolines. Nevertheless, it will be readily apparent that the apparatus and techniques may be used to determine and control the icing tendencies of other fluids.

Figure 1:
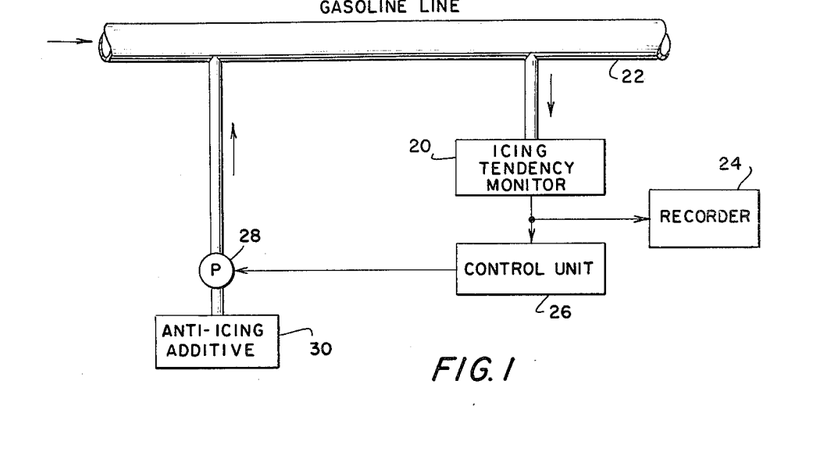
FIG. 1 is a block diagram of a typical monitoring and control scheme according to the invention.

Referring to FIG. 1, an icing tendency monitor 20 is typically supplied with a sample of gasoline to be tested from a pipeline 22, tests its icing tendency, and produces a signal representative of this characteristic of the gasoline. The signal from the monitor 20 is applied to a recorder 24 for recording and visual inspection and to a control unit 26 in which a determination is made of the deviation of the icing tendency of the gasoline from a predetermined reference established for the gasoline. A signal is generated by the control unit 26 which is applied to a pump 28 to control the amount of anti-icing additive supplied from a supply source 30 to the pipeline 22 so that the icing tendency of the gasoline conforms to the predetermined reference.

Figure 2:
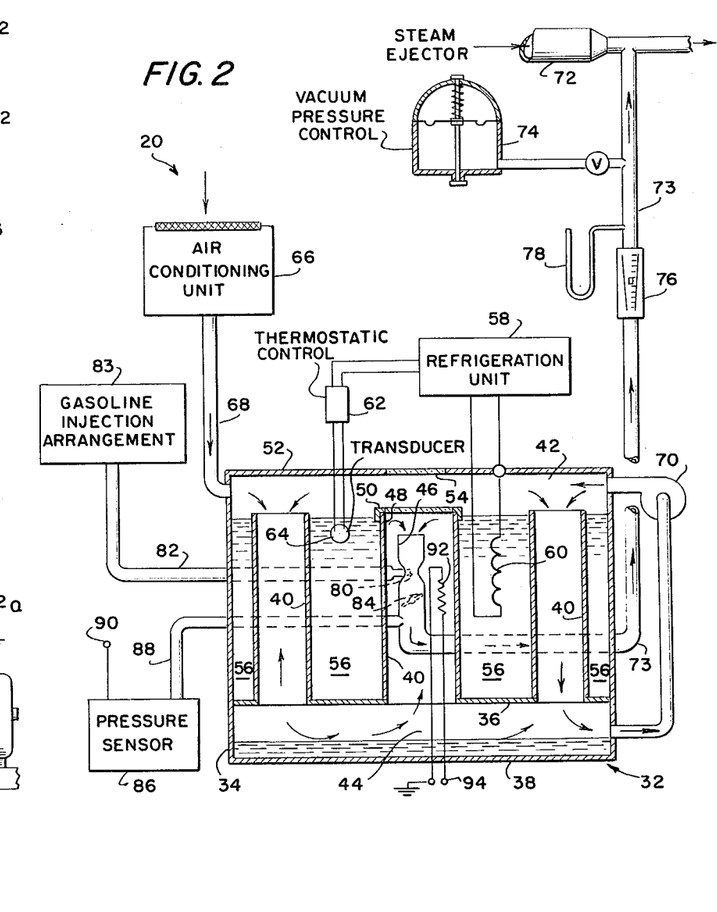
FIG. 2 is an elevational view of a typical icing tendency monitor according to the invention, with a number of its parts illustrated either in section or schematically for greater clarity.

FIG. 2 shows in detail an illustrative icing tendency monitor 20 in accordance with the invention. The actual testing of the gasoline takes place in a container 32 which may be designed in various sizes and forms. As illustrated, it consists of a generally cylindrical outer tank 34, well insulated and sealed to enable close control of the interior temperature and humidity conditions. A plate 36 is spaced from and lies parallel to a bottom plate 38 of the tank 34. A plurality of vertically positioned cylindrical tubes 40 are fastened to and extend through the plate 36. Both ends of each of the tubes 40 are open to permit air to flow between an upper space 42 and a lower space 44 of the tank 34. A venturi 46 is mounted in a central one 48 of the tubes 40. The lower end of the tube 48 is open while the upper end is sealed by a cap 50. The cap may be made from transparent material, such as Plexiglas, for example, to permit the venturi 46 to be viewed, in which case a top plate 52 of the tank 34 is formed with a corresponding viewing window 54.

The lower space 44 of the tank 34, as well as spaces 56 above the plate 36 and outside of the tubes 40, contain a fluid such as water, which has a thin layer of oil or other siutable substance on its surface to prevent evaporation of the water into the unit. Refrigerant pumped from a refrigeration unit 58 through coils 60 chills the water in the container 32, the desired temperature being maintained by a thermostatic control 62 which turns the refrigeration unit 58 on and off in response to signals from a temperature responsive transducer 64 in the water.

Air is introduced into the container 32 through an air conditioning unit 66 which establishes its humidity at a specified value and also precools it. The air then enters the top space 42 in the container through a conduit 68, passes through the tubes 40 as shown by the arrows wherein it is chilled to a predetermined temperature determined by the temperature of the tubes, and enters the venturi 46 from the tube 48. To ensure thorough chilling, the air may be circulated throughout the tank 34 by a blower 70. The air is drawn through the venturi 46 by any suitable means, such as a steam ejector 72, for example, which is coupled to the venturi by a conduit 73. In testing flammables, a steam ejector is preferable to a blower or pump arrangement because of the danger of fire or explosion associated with the latter. The rate of air flow may be controlled by conventional means, such as a vacuum pressure control 74, for example, coupled to the conduit 73. The air flow may be monitored by a conventional flow gauge 76 and a conventional pressure gauge 78.

Figure 4:
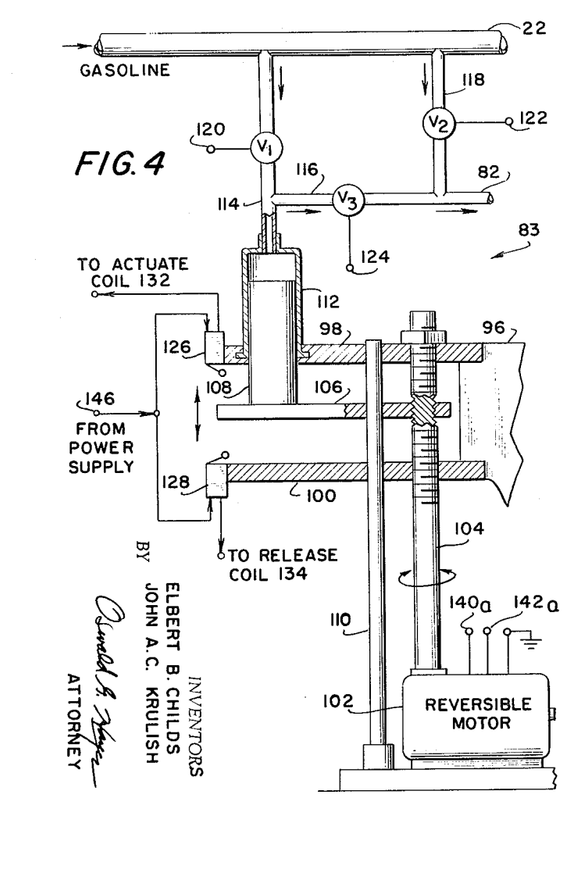
FIG. 4 is an elevational view, partly in section, of a typical fuel injection arrangement according to the invention for use with the monitor of FIG. 2 to supply fuel to be tested to the monitor.

Gasoline test samples are supplied at a uniform rate to the venturi 46 by injection through a metering nozzle 80 from a conduit 82. The gasoline is injected by a gasoline injection arrangement 83, a representative form of which is shown in FIG. 4, to be described later. The gasoline injected into the venturi 46 vaporizes and is mixed with the incoming chilled air. The latent heat of vaporization of the gasoline cools the air to below its dew point, causing moisture in the air supplied by the air conditioning unit 66 to condense on the walls of the venturi and on an obstruction in the venturi, such as a fixed throttle plate 84, for example, mounted in the venturi below the metering nozzle 80. If the chilling is severe enough, the condensed moisture freezes and ice builds up on and around the throttle plate 84, thereby restricting the flow of the air-fuel mixture through the venturi and decreasing the pressure in the venturi below the throttle plate. The amount of ice accumulating during the injection of gasoline into the venturi 46 and, therefore, the pressure below the throttle plate 84, depends upon the moisture content and preestablished temperature of the air, which may be fixed precisely, and upon the latent heat of vaporization of the gasoline. The pressure in the venturi, then, is an effective measure of the icing tendency of the gasoline for these particular conditions of temperature and humidity, which may be set to be equal to those conditions existing in the environment in which the gasoline is intended for use.

The pressure below the throttle plate 84 in the venturi 46 is sensed by a pressure sensor 86 which is coupled to this portion of the venturi through a tube 88. The pressure sensor 86 typically may comprise a differential pressure transducer which generates at an output terminal 90 a signal representative of the difference between the applied pressure and a reference pressure. For the purpose of the test, the reference pressure may be chosen to be equal to the normal pressure in the venturi 46 prior to the buildup of ice on the throttle plate 84. As ice builds up on the throttle plate, then, the pressure applied to the sensor 86 decreases, and this is represented by an increasing signal at the output terminal 90 in accordance with the increasing difference between the venturi and reference pressures.

Figure 3:
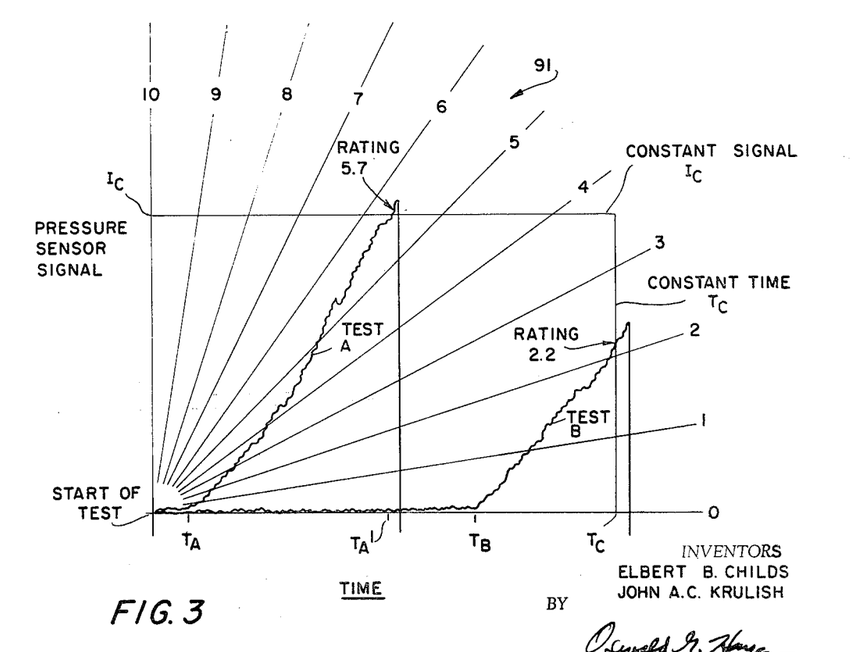
FIG. 3 are waveform diagrams of signals from the monitor of FIG. 2 pertaining to two different fuels tested, together with an illustration of an overlay useful to determine graphically the icing tendency indexes of fuels from such waveform diagrams.

Two typical curves showing the variation of the output signal at the terminal 90 of the pressure sensor 86 (operating as a differential pressure transducer) for two different gasolines are shown in FIG. 3. The gasoline designated Test A is of a relatively severe icing tendency, as indicated by a relatively short time $T_A$ following the commencement of the test at which icing is shown to commence. In the case of the gasoline designated Test B, icing is shown not to commence until time $T_B$ following the start of the test, time $T_B$ being roughly 11 times as great as time $T_A$, indicating a much less severe icing tendency for the fuel of Test B.

An icing tendency index may be formulated for a fuel in terms of the effective rate of ice formation induced by the fuel. Such an index is given by the following ratio:

$$\frac{I}{T} \quad (1)$$

where I is the total amount of ice formed in the venturi 46 and T is the time taken to form this amount of ice measured from the commencement of the test. The units in which the amount of ice and the time are expressed are determined arbitrarily. Thus, for the fuel designated Test A, the icing tendency index as defined above is represented by the pressure sensor signal magnitude at time $T_A{}'$, i.e., $I_C$, divided by the time $T_A{}'$.

The icing tendency index as defined above may be graphically determined in a simple fashion through the use of a transparent overlay 91, which is adapted to be positioned over the curve plotting the pressure sensor signal versus time, as shown in FIG. 3, and which is similar to the overlay described in "Use of Laboratory Apparatus for Rapid Assessment of Anti-Stalling Additives," D. Ellis, Society of Automotive Engineers Pamphlet #542A (June 11–15, 1962). The overlay contains a series of radial lines numbered 0 through 10 spaced equal radial distances from each other, and is placed as shown in FIG. 3 so that the point of intersection of the radial lines is placed over the intersection of the Time and Pressure Sensor Signal axes. The overlay 91 also includes a constant signal line $I_C$ and a constant time line $T_C$. The point at which the curve of pressure versus time crosses the constant signal line $I_C$, as in the case of the fuel Test A, or where the curve crosses the constant time line $T_C$, as in the case of the fuel Test B, correctly designates the icing tendency index of the fuel under test. For fuel Test A, the rating is 5.7, which is easily determined by interpolation between the radial lines 5 and 6; similarly, the rating of fuel Test B is 2.2. In the use of the overlay, it should be noted that the constant signal line $I_C$ and the constant time line $T_C$ are employed so that the amount of icing and the time of the test may be limited to workable maximums. All fuels produce curves which cross one or the other of these lines, unless, of course, icing does not commence by time $T_C$.

Referring again to FIG. 2, the test apparatus includes a heating element 92 positioned outside the venturi 46. The element is used after a test to melt the ice that has formed within the venturi during the test, and is energized by supplying power to a terminal 94. Alternatively, the heating element 92 might comprise a Nichrome wire (not shown) positioned on the bottom of the throttle plate 84, or provision might be made to pass a relatively large electrical current through the throttle plate to heat it, for example.

FIG. 4 shows an illustrative injection arrangement for withdrawing gasoline from the gasoline line 22 and injecting the gasoline during a test through the metering jet 80 into the venturi 46. The apparatus includes a stand 96 having laterally projecting upper and lower support members 98 and 100. A reversible motor 102 mounted on the stand 96 drives a threaded rod 104, which is journaled for rotation in the support members 98 and 100. The rod 104 engages a similarly threaded plate 106 located between the support members 98 and 100 to drive a piston 108 mounted on the plate 106 upwardly or downwardly depending upon the direction of rotation of the rod 104. A guide rod 110 secured to the base of the stand 96 passes through the support members 98 and 100 and the plate 106 and serves to confine the movement of the plate 106 to a vertical path.

The piston 108 moves within a cylinder 112 that is coupled to the gasoline line 22 through a conduit 114 and a valve $V_1$ positioned within the conduit. The cylinder 112 is also coupled by the conduit 114, an additional conduit 116, and a valve $V_3$ to the conduit 82 leading to the metering jet 80 located in the venturi 46. Finally, the gasoline line 22 is coupled to the conduit 82 by a conduit 118 and a valve $V_2$. The valves $V_1$, $V_2$, and $V_3$ typically are electrically actuated and are normally closed except when electrical power is applied to terminals 120, 122, and 124, respectively.

In use, the injection apparatus of FIG. 4 operates as follows. Assuming that the plate 106 is in its uppermost position adjacent the support member 98, the reversible motor 102 is powered so that it rotates the rod 104 in such a direction as to move the plate 106 and the piston 108 downwardly. During this time, power is supplied to the terminal 120 of valve $V_1$ to open the valve and to permit gasoline from the line 22 to flow into the cylinder 112. When the plate 106 is in its lowermost position adjacent the support member 100, the direction of rotation of the reversible motor 102 is reversed, driving the plate 106 upwardly. At this time, the valve $V_1$ is closed by removing power from the terminal 120, and the valve $V_3$ is opened by applying power to the terminal 124. As the plate 106 and the piston 108 are driven upwardly, then, gasoline within the cylinder 112 is driven through the valve $V_3$ and into the conduit 82 leading to the metering jet 80.

Since the rate of rotation of the motor 102 can be made constant, the flow of gasoline into the venturi 46 as injected therein by the upwardly driven piston 108 is also constant, and is not dependent upon variations in the flow of air through the venturi, as is typically the case with testing apparatus of the prior art in which the flow of air through the system is normally used in induct gasoline into the venturi.

The valve $V_2$ is provided to allow gasoline to be applied directly from the gasoline line 22 to the venturi 46 to flush the venturi, as will be explained in greater detail later.

The apparatus shown in FIGS. 2 and 4 may be controlled automatically to provide a continuous monitoring of a gasoline stream to determine its icing tendency. To this end, a pair of limit switches 126 and 128 are employed which are actuated when the plate 106 is positioned in its uppermost and lowermost positions, respectively. The apparatus shown in FIG. 5, incorporating the limit switches 126 and 128, automatically controls the reversible motor 102, the valves $V_1$, $V_2$, and $V_3$, as well as the heating element 92 to provide an automatic and continuous operation of the testing apparatus.

Figure 5:
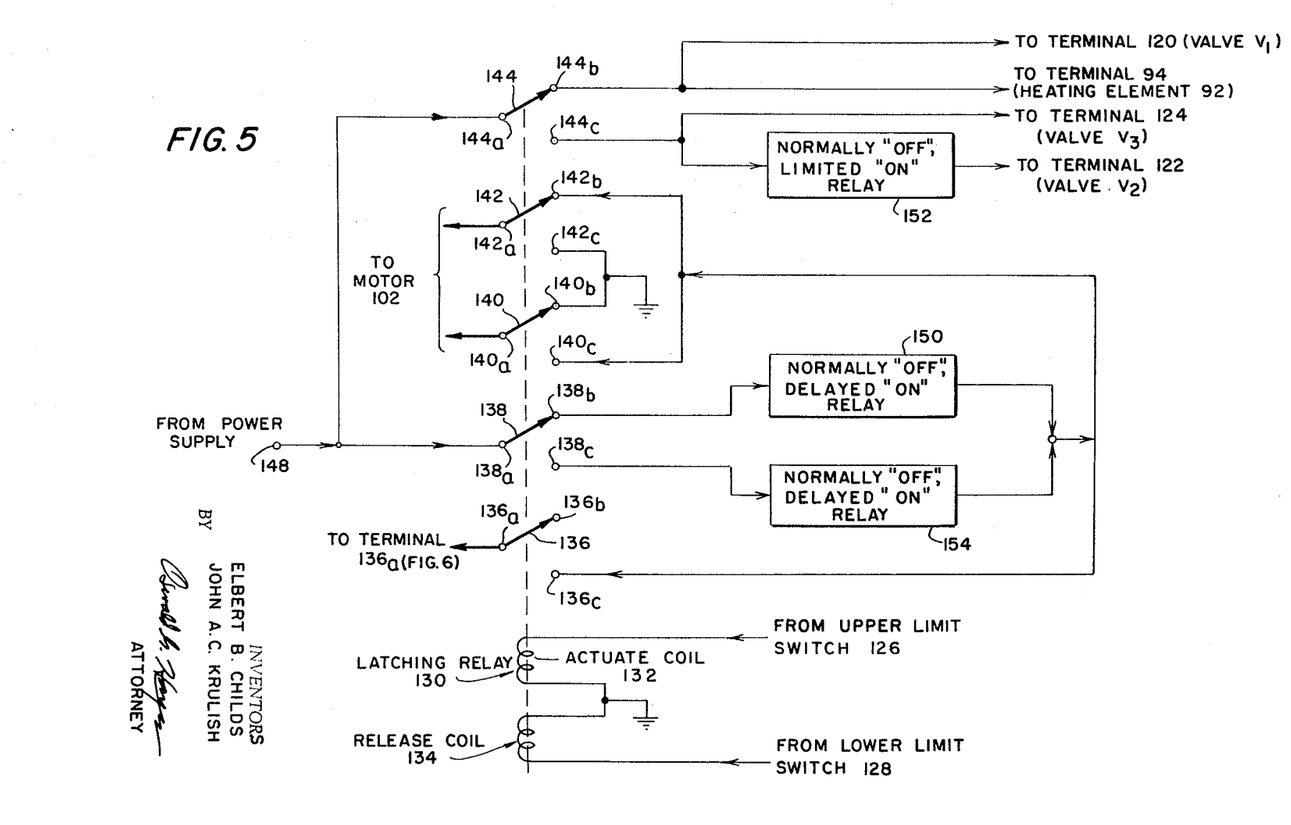
FIG. 5 is a diagram of a typical control circuit in accordance with the invention used to render completely automatic the apparatus of FIGS. 2 and 4.

Referring to FIG. 5, the control circuitry includes a latching relay 130 which incorporates an actuate coil 132 and a release coil 134. Switches 136, 138, 140, 142, and 144 also form a part of the relay, and their movement is controlled by the actuate coil 132 and the release coil 134. When the actuate coil 132 is momentarily energized, the switches 136 through 144 are positioned as shown in FIG. 5, and they remain in these positions until the release coil 134 is energized, even though the actuate coil is subsequently de-energized. When the release coil 134 is momentarily energized, the switches 136 through 144 are pulled downwardly with respect to the positions shown in the figure, and remain in these positions until the actuate coil 132 is energized, even though the release coil is subsequently de-energized. For example, when the release coil 134 is energized, the switch 136 is moved to connect together the terminals 136a and 136c.

The actuate coil 132 is energized by the upper limit switch 126 of FIG. 4. Referring to that figure, when the plate 106 is in its uppermost position adjacent the support member 98, the limit switch 126 is actuated, supplying electrical power applied to a terminal 146 from a source of supply (not shown) through the actuated limit switch 126 to the actuate coil 132. Similarly, the release coil 134 is energized by the limit switch 128. When the plate 106 is in its lowermost position adjacent the support member 100, the limit switch 128 is actuated, applying power from the terminal 146 through the limit switch to the release coil.

The apparatus of FIGS. 2, 4, and 5 operates as follows. Assume that a test has just been completed and that the piston 108 has just been driven to its uppermost position finishing the injection of gasoline through the conduit 82 and the metering jet 80 into the venturi 46. In this position of the piston, the plate 106 actuates the limit switch 126 to energize the actuate coil 132 of the latching relay 130. As explained above, when the actuate coil 132 is energized, the switches 136 through 144 are moved to the positions shown in the figure. Accordingly, electrical power supplied from the power source to a terminal 148 is applied through terminals 144a and 144b to the terminal 120 of the valve $V_1$ and to the terminal 94 of the heating element 92. Thus, the valve $V_1$ is opened, permitting gasoline to flow from the gasoline line 22 into the cylinder 112, and the heating element 92 is energized, melting the ice formed on the throttle plate 84.

At this time, power is also applied from the terminal 148 through connected terminals 138a and 138b to a Normally "Off," Delayed "On" Relay 150. Typically, the relay 150 may incorporate a ten-second delay, i.e., applying power from the terminal 138b through the relay only after ten seconds have elapsed following the energization of the relay. After the delay provided by the relay, power is applied through connected terminals 142b and 142a to terminal 142a of the reversible motor 102. The other terminal 140a of the reversible motor is coupled to the same numbered terminal in FIG. 5 which, in this position of the switch 140, is coupled through the terminal 140b to a common or ground potential. With the motor terminal 142a coupled to the source of power and the terminal 140a grounded, the reversible motor 102 is energized so that it rotates to drive the rod 104 and the plate 106 downwardly. Thus, the piston 108 moves steadily downwardly and, as it does so, gasoline from the line 22 flows through the open valve $V_1$ into the cylinder 112, filling the cylinder.

In this respect, the delay provided by the relay 150 is to ensure that the motor 102 comes to a complete halt in providing the upward movement of the piston 108 before power is again applied to the motor to drive the piston downwardly.

When the plate 106 has been driven downwardly to its lowermost position adjacent the support member 100, the limit switch 128 is actuated, energizing the release coil 134 as explained above and changing the release coil 134 as expalined above and changing the positions of all the switches 136 through 144 away from the positions shown in FIG. 5. The motor 102 is immediately de-energized since the terminals 142a and 142b are no longer connected together. In the switch 144, the terminal 144a is coupled to the terminal 144c, thereby removing power from the terminal 144b. This de-energizes the valve $V_1$, closing that valve, and de-energizes the heating element 92. Typically the time during which the heating element 92 is energized, namely, the time taken for the plate 106 to move downwardly from its uppermost to its lowermost position, is sufficient so that all the ice within the venturi 46 is melted.

In the position of the switch 144 connecting together the terminals 144a and 144c, power is applied from the terminal 148 to the terminal 124 of the valve $V_3$, thereby coupling the cylinder 112, which is filled with gasoline, to the conduit 82 and to the metering jet 80. A Normally "Off," Limited "On" Relay 152 is also actuated, which is coupled to the terminal 122 of the valve $V_2$. This relay operates to provide power for a limited time to the valve $V_2$ following the energization of the relay. As an example only, the relay 152 may have a five-second "On" cycle, so that for five seconds following the energization of the relay, power is applied through the relay to the valve $V_2$. Following the five-second interval, the relay automatically opens and remains open for the remainder of the time that the relay has power applied to it. Following the removal of power, the relay automatically resets itself.

Thus, the valve $V_2$ is momentarily opened, coupling the gasoline line 22 to the conduit 82 leading to the venturi 46. During this time, gasoline, which typically is under pressure in the line 22, is applied to the venturi 46 to wash it out and to remove any moisture remaining in the venturi and on the throttle plate 84 following the melting of the ice by the heating element 92.

Upon the energization of the release coil 134, the switch 138 is moved to connect together the terminals 138a and 138c. This energizes a Normally "Off," Delayed "On" Relay 154, which is similar to the relay 150 except for the delay time. For example, the delay provided by the relay may be three minutes, so that power is not applied through the relay until three minutes after its initial energization. This is for the purpose of allowing the venturi 46 to come to operating conditions following the heating cycle and the momentary spraying of gasoline into the venturi by the valve $V_2$ to wash away remaining traces of moisture.

Accordingly, following this three-minute interval, the relay 154 applies power through the connected terminals 140c and 140a to the terminal 140a of the reversible motor 102. The motor terminal 142a is connected to ground through the terminals 142a and 142c of the switch 142. As may be noted, then, the switches 140 and 142 serve to reverse the power connections to the terminals 140a and 142a of the reversible motor 102, and thus achieve a reversal in the direction of motor rotation, which drives the plate 106 upwardly following its downward motion, and, of course, downwardly following its upward motion.

Thus, following the three-minute delay, the plate 106 is driven upwardly, thereby injecting gasoline through the open valve $V_3$, the conduit 82, and the metering jet 80 into the venturi 46, wherein ice forms on the throttle plate 84. The plate 106 continues to be driven upwardly until it actuates the limit switch 126, which energizes the actuate coil 132, thereby de-energizing the motor 102 and initiating the action described above to automatically repeat another cycle of operation.

Concurrently with the driving upwardly of the plate 106 to inject gasoline into the venturi 46 for a test, power is applied from the terminal 148 through the relay 154 to the terminal 136c of the switch 136. Since the latching relay 130 is in the released position, the switch 136 connects the terminals 136c and 136a together, thereby transmitting power to the terminal 136a of FIG. 6, which will now be explained in detail.

Figure 6:
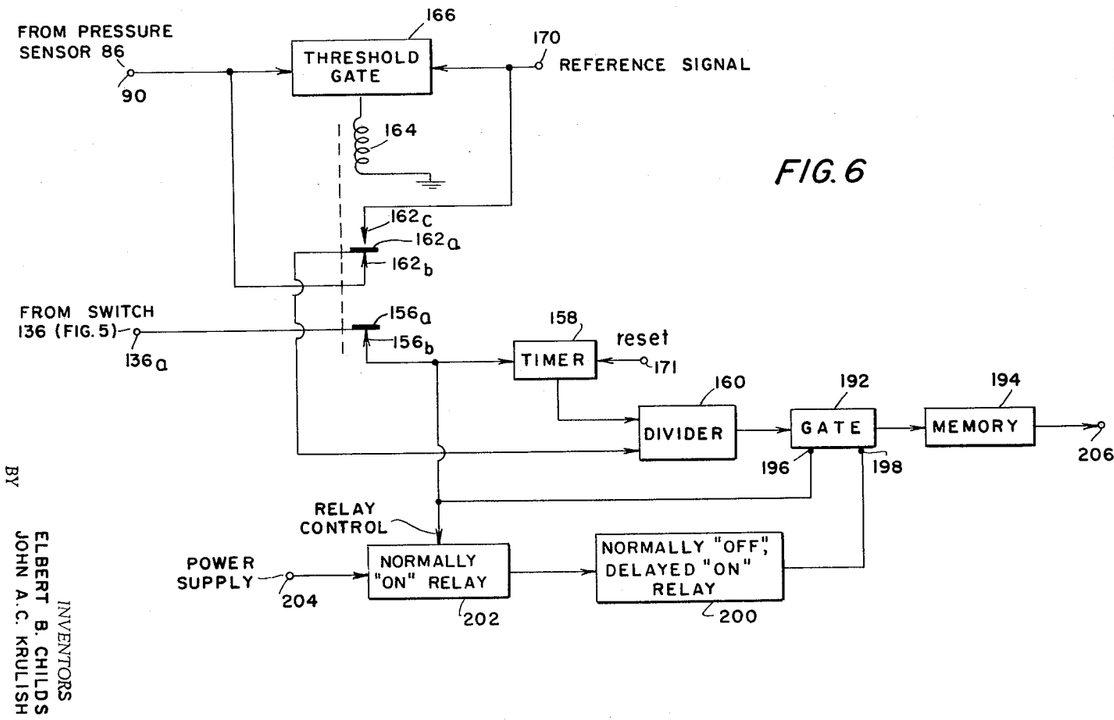
FIG. 6 is a diagram of a typical circuit in accordance with the invention used to calculate automatically the icing tendency index of a fuel tested by the monitor of FIG. 2.

FIG. 6 comprises a circuit for calculating the icing tendency index as defined in the ratio (1) above. The circuit calculates the index after a predetermined amount of ice has accumulated on the throttle plate 84 or after a predetermined time has elapsed from the commencement of the test.

Referring to FIG. 6, power from the terminal 136a is applied through a pair of normally closed relay contacts 156a and 156b to a timer 158 that generates an output signal representative of the time that has elapsed since the timer was initially energized. The output signal from the timer is applied as one input to a divider 160, the other input of which is derived from a moving relay contact 162a. The moving contact 162a is connected to either one of a pair of fixed contacts 162b and 162c depending upon the energization of a relay coil 164, which also determines whether or not the relay contacts 156a and 156b are connected together. As illustrated in FIG. 6, the coil 164 is de-energized, and the contacts 156a and 156b are connected together, as are the contacts 162a and 162b. The energization of the coil 164 is controlled by a threshold gate 166.

When the relay contacts 162a and 162b are connected together due to the coil 164 being de-energized, the signal from the output terminal 90 of the pressure sensor 86 is coupled through the relay contacts to the divider 160. The divider, therefore, generates an output signal representative of the amount of ice accumulated on the throttle plate 84 divided by the time that has elapsed from the start of the test.

The signal from the pressure sensor 86 is also applied to the threshold gate 166, which receives as its other input a reference signal applied to a terminal 170. The reference signal may be generated by a battery or other regulated power supply, and represents a predetermined amount of ice accumulation on the throttle plate 84. As long as the signal from the pressure sensor 86 is less than the reference signal, the threshold gate 166 is de-actuated, resulting in the relay coil 164 being de-energized. In the event that, during the test, the signal from the pressure sensor 86 never is as great as the reference signal, the timer 158 is energized until the test has ended, at which time the actuate coil 132 of FIG. 5 is energized, removing power from the terminal 136a and de-energizing the timer 158. In this case, then, the output signal from the divider 160 represents the total amount of ice that has accumulated on the throttle plate 84 divided by the total time taken for the test. Such a signal would be produced by the fuel Test B of FIG. 3.

If, however, during the test the signal from the pressure sensor 86 becomes equal to the reference signal applied to the terminal 170, the threshold gate 166 is actuated, energizing the relay coil 164 and moving the relay contacts 162a and 156a upwardly. Power is accordingly removed from the contact 156b, de-energizing the timer. Also, the contacts 162a and 162c are connected together, supplying the divider 160 with the reference signal from the terminal 170. In this case, then, the output signal from the divider represents a predetermined amount of ice that has built up on the throttle plate 84 divided by the time taken to build up that amount of ice. Such a signal would be produced by the fuel Test A of FIG. 3.

In both of the two cases just described, the signal from the divider 160 is representative of the icing tendency index of the fuel under test, as defined in ratio (1) above.

The timer 158 is typically reset by a signal applied to a terminal 171 connected to the timer. The reset signal may be generated at any time after the test has been completed and the signal from the divider 160 has been recorded or otherwise used.

Figure 7:
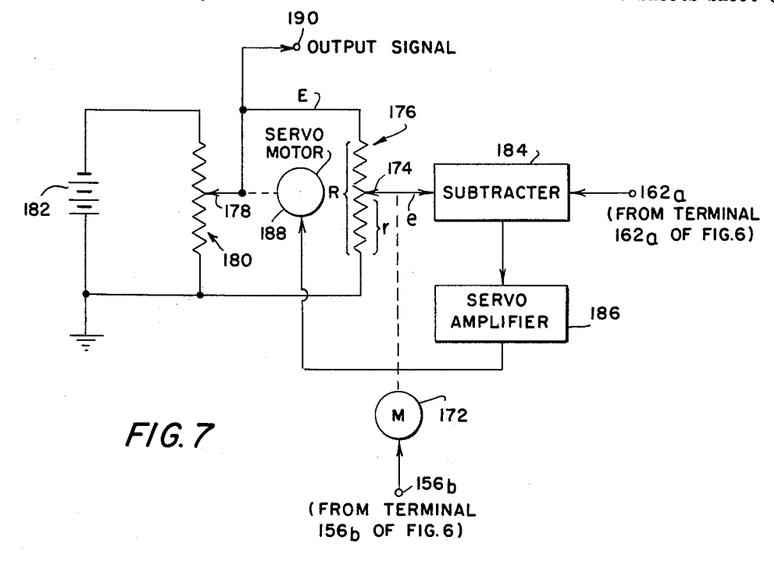
FIG. 7 is a diagram of a circuit used to replace certain ones of the components in the circuit of FIG. 6.

The timer 158 and the divider 160 of FIG. 6 conveniently may be instrumented by the circuit shown in FIG. 7. Referring to that figure, the signal from the fixed relay contact 156b of FIG. 6 is applied to a motor 172, which, powered from the start of a test, drives a movable contact 174 of a potentiometer 176. The potentiometer 176 is coupled to a movable contact 178 of a second potentiometer 180 connected across a battery 182 or other source of regulated power supply. The movable contact 174 of the potentiometer 176 is electrically connected to a subtracter 184 which receives its other input from the terminal 162a of FIG. 6. As explained above, the signal on the terminal 162a is either the signal from the pressure sensor 86 or the reference signal applied to the terminal 170. The output of the subtracter 184 is applied to a servoamplifier 186 which is coupled to a servo-motor 188 that drives the movable contact 178 of the potentiometer 180. The output signal from the system is from a terminal 190 which is electrically connected to the movable potentiometer contact 178.

The operation of the circuit of FIG. 7 may be understood more easily by examining in detail the voltage across the potentiometer 176 and at the movable contact 174. Using Ohm's Law, the following relation can be written:

$$\frac{E}{e} = \frac{R}{r} \quad (2)$$

where E is the signal at the output terminal 190, i.e., the voltage across the potentiometer 176; e is the voltage with respect to ground of the movable contact 174; R is the total resistance of the potentiometer 176; and r is the resistance to ground of the movable contact 174.

Equation 2 may be rewritten as follows:

$$E = \frac{eR}{r} \quad (3)$$

It will be noted that the subtracter 184 and servo-amplifier 186 energize the servo-motor 188 that adjusts the position of the movable contact 178 of the potentiometer 180. The servo-motor moves the contact 178 and adjusts the potential E across the contact 178 and adjusts the potential E across the potentiometer 176 so that the potential e applied to the subtracter 184 from the movable contact 174 is always equal to the signal applied to the terminal 162a of the subtracter. This latter signal is representative of the amount of icing that has occurred in the venturi 46 and, accordingly, the factor e in Equation 3 may be replaced by $k_1 I$, where I is the amount of icing that has occurred in the venturi and $k_1$ is a constant relating I and e.

It will be noted further that the movable contact 174 of the potentiometer 176 is driven by the motor 172, and that the position of this movable contact, i.e., the resistance r, is representative of the time that has elapsed since the beginning of the test. Therefore, the factor r in Equation 3 may be replaced by the symbol $k_2 T$, where T is the time that has elapsed since the beginning of the test and $k_2$ is a constant relating T and r.

Finally, it will be noted that R in Equation 3 represents the total fixed resistance of the potentiometer 176, and, therefore, this factor may be designated as a constant $k_3$.

Making the above substitutions, Equation 3 may be rewritten as follows:

$$E = K\frac{I}{T} \quad (4)$$

where K is a constant equal to $$\frac{k_1 k_3}{k_2}$$

Comparing Equation 4 and ratio (1), it will be noted that the output signal E at the output terminal 190 is representative of the icing tendency index as defined in ratio (1) for the fuel under test.

Referring again to FIG. 6, the output signal from the divider 160, or the signal from the output terminal 190 of the circuit of FIG. 7, is applied to a gate 192. The gate 192, when not inhibited, applies the signal from the divider 160 to a memory 194 which, at the time of receiving the signal from the divider 160, is reset to remove any previous signal stored therein and then stores the signal from the divider. The gate 192 is inhibited by the presence of a signal on either one of two inhibiting terminals 196 and 198. The terminal 196 is connected to the fixed relay contact 156b and, accordingly, receives a signal as long as power is applied to the relay contact.

The inhibiting terminal 198 of the gate 192 receives power from a Normally "Off," Delayed "On" Relay 200 which is energized by a Normally "On" Relay 202. Power is supplied to the relay 202 from a terminal 204; however, the relay is controlled by the signal from the contact 156b. As long as this contact has power applied thereto, the relay 202 is in its "off" state. When power is removed from the contact 156b, the relay 202 is turned "on" and passes power from the terminal 204 to the relay 200. The relay 200, then, is energized and changes from its "off" state to its "on" state after a predetermined delay, which may be one second, for example.

As may be noted, then, as long as power is applied to the contact 156b, the gate 192 is inhibited by the signal applied to the terminal 196. When power is removed from the contact 156b, the terminal 198 is energized, after a predetermined delay, to inhibit the gate. Accordingly, the gate 192 is always inhibited except for the short delay period supplied by the relay 200. This delay period is at the end of a test when power is removed from the relay contact 156b and the signal from the divider 160 represents the icing tendency index of the fuel under test, as described above. During this time, then, the signal from the divider 160 is gated into the memory 194 wherein it is stored. The signal from the memory 194 is applied to an output terminal 206 which may be coupled to any recorder, such as the recorder 24 of FIG. 1, for visual inspection, for example, or to a control system for the purpose of controlling a blending operation in accordance with the icing tendency index of the gasoline under test. Such a system is shown in detail in FIG. 8.

Figure 8:
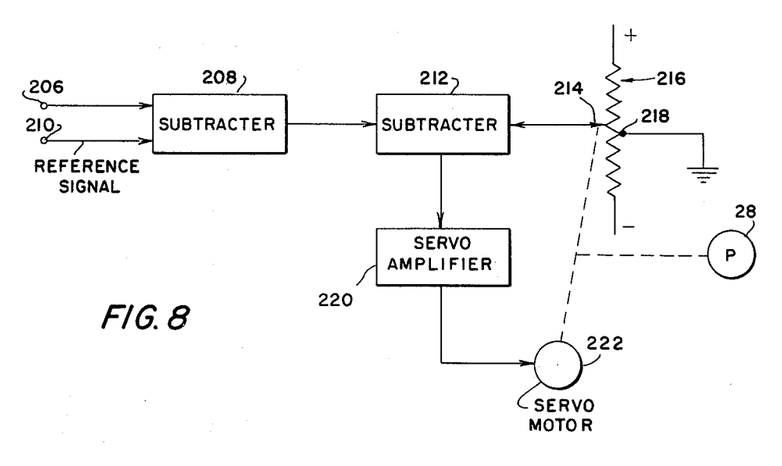
FIG. 8 is a diagram of typical apparatus in accordance with the invention for automatically controlling the composition of a fluid in accordance with its icing tendency.

Referring to FIG. 8, the signal from the output terminal 206 representative of the icing tendency index of the gasoline under test is applied to a subtracter 208. Also applied to the subtracter 208 from a terminal 210 is a reference signal from a regulated source of supply (not shown) which is representative of a desired icing tendency index for the gasoline. The subtracter 208, therefore, generates an error signal representative of the deviation of the actual icing tendency index of the gasoline from that desired. This signal is applied to a subtracter 212 which is supplied with a signal from a movable contact 214 of a potentiometer 216. The potentiometer is coupled across a suitable source of potential, typically with its midpoint 218 grounded, as shown in the figure. The output of the subtracter 212 is applied to a servo-amplifier 220, the output of which energizes a servo-motor 222 coupled to the movable contact 214 of the potentiometer 216. In this fashion, the setting of the movable contact 214 is varied until the potential picked off by the contact is equal to the error signal from the subtracter 208. The servo-motor 222 is also coupled to the pump 28 of FIG. 1, which, as described above, varies the amount of anti-icing additive that is applied from the source 30 to the gasoline line 22.

In this fashion, the deviation between the icing tendency index of the gasoline as detected and a predetermined reference is used to vary the amount of additive applied to the blending line so that the gasoline meets a predetermined standard.

It will be noted that each test of a gasoline is of a few minutes' duration, and each signal representative of the icing tendency index is stored in the memory 194 (FIG. 6) until the next signal from the following test is received. Thus, the control of the amount of additive added to the gasoline line changes in step-wise fashion as the signals from the memory 194 periodically change. Typically, the gasoline which flows to a barge, for example, or other storage medium, is sufficiently intermixed therein so that any small deviations from standard in the batches of gasoline corresponding to the different tests are averaged, in effect, and the gasoline conforms to the standard.

In summary, then, a system has been described for the monitoring of a fluid to determine its icing tendency, as well as to control the blending together of the various components of the fluid in accordance with the detected icing tendency. As noted above, although the particular apparatus described in detail relates to gasolines, the invention is not limited thereto. Further, it will be understood by those skilled in the art that the above described embodiments are capable of being varied and modified considerably without departing from the spirit and scope of the invention. For example, in the apparatus of FIG. 4, the valve $V_2$ introduces gasoline into the venturi 46 for the purpose of flushing away remaining traces of moisture. Under certain circumstances it may be desirable to connect the valve not to the gasoline line 22, but to a source of a flushing fluid, such as alcohol, when, for example, the type of gasoline in the line 22 is changed and is replaced by one with an entirely different icing tendency. In this case, the alcohol washes away all traces of additive remaining in the venturi and prepares the venturi for a new sequence of tests. Normally, however, flushing with the same gasoline as that tested to remove condensed moisture is desirable, since this allows additives to remain or "hold over" in the venturi in a fashion similar to that in which they remain in the venturi of an automobile in actual use.

Accordingly, the foregoing description should be considered illustrative, and the invention should be taken to be defined by the following claims.

We claim:

1. In apparatus for determining and controlling the icing tendency of a fluid, the combination of a passage having an obstruction therein, means for flowing a gas-water vapor mixture through the passage, means for applying a sample of the fluid into the flowing gas-water vapor mixture during each one of a plurality of successive intervals so as to cause ice to form on the obstruction with a concurrent change in pressure in the passage adjacent the obstruction, detecting means for detecting the change in pressure, means operative when the fluid is not being injected into the gas-water vapor mixture for removing the ice formed on the obstruction during the injection of the previous sample of fluid into the gas-water vapor mixture, and control means responsive to the detecting means for varying the composition of the fluid.

2. In apparatus for determining the icing tendency of a fluid, the combination of a passage having an obstruction therein, means for flowing a gas-water vapor mixture through the passage, means for applying a sample of the fluid into the flowing gas-water vapor mixture so as to cause ice to form on the obstruction with a concurrent change in pressure in the passage adjacent the obstruction, detector means for generating a pressure signal representative of the change of pressure in the passage, means for generating a time signal representative of the time elapsed from the commencement of the application of the fluid sample into the flowing gas-water vapor mixture, and means for generating an output signal representative of the ratio of the pressure signal and the time signal.

3. Apparatus as recited in claim 2, wherein the means for generating the output signal generates that signal when the pressure signal is of a predetermined value.

4. Apparatus as recited in claim 2, wherein the means for generating the output signal generates that signal when the time signal is of a predetermined value.

5. Apparatus as recited in claim 3, wherein the means for generating the output signal generates that signal when the time signal is of a particular value if the pressure signal never reaches the predetermined value.

6. Apparatus as recited in claim 2, wherein the means for generating the time signal and the means for generating the output signal comprise a potentiometer having a movable contact that taps a portion of the total impedance of the potentiometer, means for driving the movable contact so that the position of the movable contact varies in accordance with the time elapsed from the commencement of the application of the fluid sample into the flowing gas-water vapor mixture, a signal source electrically connected across the potentiometer and constituting an output signal representative of the rate of ice formation on the obstruction, and means for varying the signal source so that the signal appearing at the movable contact of the potentiometer is maintained in a predetermined relation to the pressure signal.

7. Apparatus as recited in claim 6, wherein the means for varying the signal source comprises means for generating a difference signal representative of the difference between the signal from the movable contact of the potentiometer and the pressure signal, and means energized by the difference signal for varying the signal source so that the signal from the movable contact of the potentiometer is made substantially equal to the pressure signal, thereby reducing the difference signal substantially to zero.

8. In a method of determining the icing tendency of a fluid, the steps comprising flowing a gas-water vapor mixture through a passage having an obstruction therein, applying a sample of the fluid into the flowing gas-water vapor mixture during each one of a plurality of successive intervals so as to cause ice to form on the obstruction with a concurrent change in pressure in the passage adjacent the obstruction, detecting the change in pressure in the passage, and, when the fluid is not being injected into the gas-water vapor mixture, removing the ice formed on the obstruction during the injection of the previous sample of fluid into the gas-water vapor mixture.

9. In a method of determining the icing tendency of a fluid, the steps comprising flowing a gas-water vapor mixture through a passage having an obstruction therein, applying a sample of the fluid into the flowing gas-water vapor mixture so as to cause ice to form on the obstruction with a concurrent change in pressure in the passage adjacent the obstruction, generating a pressure signal representative of the change of pressure in the passage, generating a time signal representative of the time elapsed from the commencement of the application of the fluid sample into the flowing gas-water vapor mixture, and generating an output signal representative of the ratio of the pressure signal and the time signal.

10. The method as recited in claim 9, comprising the further step of comparing the pressure signal with a reference signal, the output signal being generated when the pressure signal is substantially equal to the reference signal.

11. The method as recited in claim 9, comprising the further step of limiting the time signal to a predetermined maximum value, the output signal being generated when the time signal is of the predetermined value.

12. The method as recited in claim 10, comprising the further step of limiting the time signal to a predetermined maximum value, the output signal being generated when the time signal is of the predetermined value if the pressure signal never becomes equal to the reference signal.

13. The method as recited in claim 9, wherein the fluid is applied into the flowing gas-water vapor mixture periodically in batches, the pressure signal being generated at the conclusion of each batch application of fluid into the flowing gas-water vapor mixture, and wherein the ice formed on the obstruction is removed after each batch application of fluid into the flowing gas-water vapor mixture.

14. In apparatus for detecting and controlling the icing tendency of a fluid, the combination of a passage having an obstruction therein, means to pass a gas maintained at a predetermined temperature and moisture content through the passage, means for applying the fluid into the passage adjacent the obstruction, detecting means for detecting the ice formation on the obstruction, and control means responsive to the detecting means for varying the composition of the fluid.

15. Apparatus as recited in claim 14, wherein the control means adds to the fluid a product having an effect on the icing tendency of the fluid to conform the icing tendency of the fluid to a predetermined reference.

16. Apparatus as recited in claim 14, wherein the detecting means detects the rate at which ice is formed on the obstruction.

17. Apparatus as recited in claim 14, wherein the detecting means detects one of the ratios $I/t$ and $i/T$, where I represents a preestablished amount of ice formed on the obstruction and $t$ represents the time taken to form that amount of ice, and where T represents a preestablished time and $i$ represents the amount of ice formed on the obstruction in that time.

18. Apparatus as recited in claim 14, wherein the means for applying the fluid to the passage applies the fluid periodically in batches, the detecting means detecting the ice formation on the obstruction at the conclusion of each batch application of fluid to the passage, and wherein means are included operative after each batch application of fluid to the passage for removing the ice formed on the obstruction.

19. Apparatus as recited in claim 18, wherein the control means comprises means for comparing the detected ice formation with a predetermined reference ice formation established for the fluid, and means responsive to the difference between the detected and reference ice formations for varying the amount of a product having an effect on the icing tendency of the fluid that is added to the fluid, thereby to conform the icing tendency of the fluid to a standard established for the fluid.

20. In apparatus for detecting and controlling the icing tendency of a fluid, the combination of a passage having an obstruction therein, means for flowing a gas-water vapor mixture through the passage, means for periodically applying the fluid in batches into the gas-water vapor mixture, each such batch application of fluid causing ice to form on the obstruction with a concurrent change in pressure in the passage adjacent the obstruction, detecting means for detecting the change in pressure in the passage, control means responsive to the detected pressure change for varying the composition of the fluid, and means operative after each such batch application of fluid for removing the ice formed on the obstruction.

21. Apparatus as recited in claim 20, wherein the control means comprises means operative at the conclusion of each batch application of fluid into the gas-water vapor mixture for determining the ratio of the pressure in the passage and the time taken to apply the batch of fluid into the gas-water vapor mixture, means for storing the determined ratio until the conclusion of the next batch application of fluid to the passage, and means responsive to each stored determined ratio for controlling the composition of the fluid.

22. Apparatus as recited in claim 21, wherein the last-named means varies the amount of at least one product that is added to the fluid to affect the icing tendency of the fluid in accordance with the deviation of the stored determined ratio from a predetermined reference ratio established for the fluid.

23. In a method of monitoring and controlling the icing tendency of a fluid, the steps comprising causing a gas of a predetermined temperature and moisture content to pass through a passage, applying the fluid to the passage, detecting the formation of ice in the passage, and regulating the composition of the fluid in response to the detected formation of ice in the passage.

24. The method as recited in claim 23, wherein a product having an effect on the icing tendency of the fluid is added to the fluid in response to the detected ice formation in the passage to conform the icing tendency of the fluid to a predetermined reference.

25. The method as recited in claim 23, wherein the fluid is formed from a plurality of components and wherein the amount of at least one of the components of the fluid having an effect on the icing tendency of the fluid is varied in response to the detected ice formation in the passage.

26. The method as recited in claim 23, wherein the composition of the fluid is regulated in response to the rate at which ice is formed in the passage.

27. In a method of monitoring and controlling the icing tendency of a fluid, the steps comprising causing a gas of a predetermined temperature and moisture content to pass through a passage, applying the fluid to the passage, detecting one of the ratios $I/t$ and $i/T$, where I represents a preestablished amount of ice formed in the passage and $t$ represents the time taken to form that amount of ice, and where T represents a preestablished time and $i$ represents the amount of ice formed in the passage in that time, and regulating the composition of the fluid in response to one of the ratios.

28. In a method of monitoring and controlling the icing tendency of a fluid, the steps comprising causing a gas of a predetermined temperature and moisture content to pass through a passage, applying the fluid to the passage, detecting the formation of ice in the passage, generating a first signal representative of the detected formation of ice in the passage, generating a reference signal representative of the formation of ice of a reference fluid, and varying the composition of the fluid in response to the first and reference signals.

29. The method as recited in claim 28, wherein an anti-icing additive is added to the fluid in varying amounts in response to the difference between the first and reference signals.

30. The method as recited in claim 28, wherein the fluid is applied periodically to the passage in batches, the ice formation being detected and the first signal being generated at the conclusion of each batch application of fluid to the passage, and wherein the ice formed in the passage is removed after each batch application of fluid to the passage.

31. In apparatus for determining and controlling the icing tendency of a fluid, the combination of a passage, means for passing a gas maintained at a predetermined temperature and moisture content through the passage, injecting means for injecting the fluid into the passage, the injecting means including timing means operative to cause the injecting means to inject the fluid only during successive intervals recurring at constant frequency, detecting means to detect the ice formation in the passage, means operative between the intervals for removing the ice formed in the passage, and control means responsive to the detecting means for varying the composition of the fluid.

32. In apparatus for determining and controlling the icing tendency of a fluid, the combination of a passage, means for passing a gas maintained at a predetermined temperature and moisture content through the passage, means for injecting the fluid into the passage, detecting means for detecting the rate at which ice forms in the passage, and control means responsive to the detecting means for varying the composition of the fluid.

33. In apparatus for determining and controlling the icing tendency of a fluid, the combination of (a) a passage having an obstruction therein, (b) means for flowing through the passage a gas-water vapor mixture, (c) first valve means, (d) second valve means, (e) injecting means for injecting a sample of the fluid into the flowing gas-water vapor mixture to cause ice to form on the obstruction with a concurrent change in pressure in the passage adjacent to the obstruction, the injecting means comprising (1) a piston contained within a cylinder having a closed end and (2) drive means for driving the piston back and forth between a first position near the closed cylinder end and a second position farther away from the closed cylinder end, the drive means driving the piston from the second position to the first position at constant speed, and the closed cylinder end communicating with a source of the fluid through the first valve means and with the passage through the second valve means, (f) detecting means for detecting the change of pressure in the passage, and (g) control means responsive to the detecting means for varying the composition of the fluid.

34. Apparatus as recited in claim 33, wherein the means for driving the piston drives the piston alternately from the first position to the second position and from the second position to the first position, and wherein means are included for opening the first valve means when the piston is driven from the first position to the second position and for opening the second valve means when the piston is driven from the second position to the first position.

35. Apparatus as recited in claim 34, wherein removing means are included for removing the ice formed on the obstruction, the removing means being operative after the piston has moved from the second position to the first position.

36. Apparatus as recited in claim 35, wherein the removing means comprises a heating element positioned adjacent the obstruction to melt the ice thereon.

37. In combination with apparatus as recited in claim 35, a third valve means coupling together the source of the fluid and the passage, and means for opening the third valve means to apply fluid from the source to the passage to flush the passage after the ice has been removed from the passage by the removing means and before the piston is next driven from the second position to the first position.

38. In a method of determining the icing tendency of a fluid, the steps comprising injecting the fluid into a gas maintained at a predetermined temperature and moisture content and detecting the rate of ice formation due to freezing of the water caused by evaporation of the fluid.

39. In a method of determining the icing tendency of a fluid, the steps comprising passing a gas maintained at a predetermined temperature and moisture content through a passage, injecting the fluid into the passage only during successive intervals recurring at constant frequency, detecting the ice formed in the passage during the intervals, and removing the ice formed in the passage between the intervals.

40. In apparatus for determining the icing tendency of a fluid, the combination of a passage, means for passing a gas maintained at a predetermined temperature and moisture content through the passage, means for injecting the fluid into the passage, and detecting means to detect the ice formation in the passage, including means for detecting one of the ratios $I/t$ and $i/T$, where I represents a pre-established amount of ice formed in the passage and $t$ represents the time taken to form that amount of ice, and where T represents a pre-established time and $i$ represents the amount of ice formed in the passage in that time.

References Cited by the Examiner

UNITED STATES PATENTS

| | | | |
|---|---|---|---|
| 2,056,615 | 10/1936 | Moore | 123—132 |
| 2,541,512 | 2/1951 | Hahn | 73—17 X |
| 2,750,433 | 6/1956 | Tourneau et al. | 73—17 X |
| 2,930,943 | 3/1960 | Ruge | 73—161 X |
| 2,941,061 | 6/1960 | Bowers | 340—234 X |
| 3,000,812 | 9/1961 | Boyd | 208—138 |
| 3,086,393 | 4/1963 | Silverschotz | 73—170 |

OTHER REFERENCES

"The Use of Digital Computers in Petroleum Refining," by Hagler and Shea, from Advances in Petroleum Chemistry and Refining, by Kobe and McKetta, Jr., vol. 5, Interscience Publishers, 1962, pages 117–152.

"Special Purpose Computers in the Control of Continuous Processes," by Amber et al., from Data Control-Automatic Control, vol. 7–8, May 1958, pages 43–48.

RICHARD C. QUEISSER, *Primary Examiner.*

DAVID SCHONBERG, *Examiner.*

UNITED STATES PATENT OFFICE

CERTIFICATE OF CORRECTION

Patent No. 3,232,097                           February 1, 1966

Elbert B. Childs et al.

It is hereby certified that error appears in the above numbered patent requiring correction and that the said Letters Patent should read as corrected below.

Column 9, lines 44 and 45, strike out "across the contact 178 and adjusts the potential E"; column 10, line 60, for "couplied" read -- coupled --.

Signed and sealed this 24th day of January 1967.

SEAL)

Attest:

ERNEST W. SWIDER                              EDWARD J. BRENNER Attesting Officer                                    Commissioner of Patents